United States Patent
Stork et al.

(10) Patent No.: US 7,248,990 B2
(45) Date of Patent: Jul. 24, 2007

(54) METHOD FOR MEASURING THE SPEED OF AN ELECTRICAL MACHINE

(75) Inventors: Holger Stork, Buehl (DE); Martin Zimmermann, Sasbach (DE); Michael Schuhen, Buehl-Oberweiher (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 11/173,577

(22) Filed: Jul. 1, 2005

(65) Prior Publication Data

US 2006/0001388 A1 Jan. 5, 2006

(30) Foreign Application Priority Data

Jul. 3, 2004 (DE) .................... 10 2004 032 264

(51) Int. Cl.
*G01P 3/00* (2006.01)
(52) U.S. Cl. ........................ 702/145; 318/432
(58) Field of Classification Search ............... 702/145
See application file for complete search history.

(56) References Cited

U.S. PATENT DOCUMENTS

| | | | | |
|---|---|---|---|---|
| 4,680,518 | A | 7/1987 | Kurakake et al. | 318/561 |
| 5,689,165 | A * | 11/1997 | Jones et al. | 318/701 |
| 7,030,583 | B2 * | 4/2006 | Lelkes et al. | 318/439 |
| 2004/0111233 | A1 * | 6/2004 | Gerlach | 702/145 |
| 2005/0029972 | A1 * | 2/2005 | Imai et al. | 318/254 |

FOREIGN PATENT DOCUMENTS

| | | |
|---|---|---|
| DE | 41 22 391 | 1/1993 |
| EP | 0 314 800 | 5/1989 |
| EP | 0 514 847 | 11/1992 |
| EP | 0 593 523 | 4/1994 |

* cited by examiner

*Primary Examiner*—John Barlow
*Assistant Examiner*—Jonathan Moffat
(74) *Attorney, Agent, or Firm*—Davidson, Davidson & Kappel, LLC

(57) ABSTRACT

In a method for measuring the speed of an electrical machine having a stator, a rotor and a winding, in particular of an electronically commutated motor, a speed-measurement signal $\omega$ is sampled, in that a measured speed value $\omega(k)$ for the rotor is determined for each of a series of sampling instants. Moreover, a moment of inertia value for the mass moment of inertia of the rotor is determined. In addition, a current signal I is sampled, in that a current value I(k) for the electrical current in the winding is determined for each of the sampling instants. An estimated value $\omega_s(k)$ for each of the measured speed values $\omega(k)$ is determined from a measured speed value $\omega_k(k-1)$ assigned to an earlier sampling instant, from the current signal I and from the moment of inertia value. A tolerance band containing the estimated value $\omega_s(k)$ is assigned to this estimated value $\omega_s(k)$. If the measured speed value $\omega(k)$ lies outside of the tolerance band, the measured speed value $\omega(k)$ is replaced by a speed value $\omega_k(k)$ that is within the tolerance band.

11 Claims, 1 Drawing Sheet

METHOD FOR MEASURING THE SPEED OF AN ELECTRICAL MACHINE

Priority is claimed to German Patent Application No. DE 10 2004 032 264.3, filed on Jul. 3, 2004, the entire disclosure of which is incorporated by reference herein.

BACKGROUND

The present invention is directed to a method for measuring the speed of an electrical machine having a stator, a rotor and a winding, in particular of an electronically commutated motor, a speed-measurement signal ω being sampled, in that a measured speed value ω(k) for the rotor is determined for each of a series of sampling instants.

A method of this kind for measuring the speed of an electronically commutated motor having a permanent magnet rotor, on whose periphery magnetic segments are arranged, which cooperate with an electronically commutated winding disposed on the stator, is known in the field. In this context, Hall-effect sensors mounted on the stator of the electronically commutated motor are used to record the position of the magnetic segments. Depending on the magnetic field, the output signal of the Hall-effect sensors is 0 or 1. Measured speed values are calculated from the time interval between two consecutive changes in the measurement signals of the Hall-effect sensors and from an angular offset between mutually adjacent magnetic segments in the circumferential direction of the rotor that is calculated from the number of pole pairs of the rotor. Since, with respect to their positioning on the periphery of the rotor and their dimensions in the circumferential direction, the magnetic segments exhibit manufacturing tolerances which are not known more precisely, deviations arise, however, between the actual angular offset and the calculated angular offset used in determining the measured speed values. Manufacturing tolerances of 20% are quite common. Given a constant rotor speed, such manufacturing tolerances result in the speed-measurement signal assuming, in rapid succession, arbitrary values in intervals from −20% to +20% of the actual speed value.

Another speed error can occur in response to a direction reversal of the rotor. During rotation in one direction, initially a first magnetic section and then a second magnetic section pull past a Hall-effect sensor. The resulting change in the magnetic field causes the output signal of the Hall-effect sensor to change. If the rotor comes to a stop and then moves in the opposite direction, the first magnetic section is then moved past the Hall-effect sensor again, thereby changing the output signal anew. The time interval between the two signal changes can be very short, which results in a very high speed being erroneously determined.

The speed signal could, in fact, be smoothed in that, for example, the mean value is generated in each case from the next-to-last, last and momentary measured speed value. However, the averaged measured speed value would then not reflect the speed at the current instant, but rather at the instant of the last change in the Hall-effect sensor signal. This time delay between the calculated speed signal and the actual speed signal is disadvantageous, above all when the speed signal is fed as an actual value signal to a speed control circuit. At low speeds, in particular, the delay time assumes relatively large values, so that the quality of the speed control decreases correspondingly.

SUMMARY OF THE INVENTION

An object of the present invention is to provide a method for measuring the speed of an electrical machine that will enable a relatively precise speed-measurement signal, which exhibits little time delay with respect to the measured speed values, to be determined in a simple manner.

The present invention provides a method for measuring the speed of an electrical machine having a stator, a rotor and a winding, in particular of an electronically commutated motor, a speed-measurement signal ω being sampled, in that a measured speed value ω(k) for the rotor is determined for each of a series of sampling instants, wherein a moment of inertia value for the mass moment of inertia of the rotor is determined; a current signal I is sampled, in that a current value I(k) for the electrical current in the winding is determined for each of the sampling instants; an estimated value $\omega_s(k)$ for each of the measured speed values ω(k) is determined from a measured speed value $\omega_k(k-1)$ assigned to an earlier sampling instant, from the current signal I and from the moment of inertia value; a tolerance band containing the estimated value $\omega_s(k)$ is assigned to this estimated value $\omega_s(k)$; and, in the case that the measured speed value ω(k) lies outside of the tolerance band, the measured speed value ω(k) is replaced by a speed value $\omega_k(k)$ that is within the tolerance band.

Thus, measured speed values ω(k), which lie outside of the tolerance band and, therefore, are not plausible, are advantageously limited to the tolerance band, the limit values for the tolerance band being dynamically determined. This enables fluctuations in the speed-measurement signal to be smoothed in a simple manner, without any appreciable time delay occurring between the smoothed, i.e., corrected speed-measurement signal and the measured speed signal. Underlying the limitation is the dynamic equation of the electrical machine:

$$J \cdot d\omega/dt = K_t \cdot I$$

J is the mass moment of inertia of the rotor, ω is the rotor speed, $K_t$ a constant of the electrical machine, I the winding current, and t is the time. Estimated speed value $\omega_s(k)$ is able to be determined as follows, T signifying a sampling time:

$$\omega_s(k) = \omega(k-1) + \frac{T \cdot K_t \cdot I(k-1)}{J}$$

When the width of the tolerance band is set to $\pm\Delta\omega_{limit}$, upper boundary value $\omega_{HighLim}(k)$ and lower boundary value $\omega_{LowLim}(k)$ of the tolerance band may be determined for the k-th measured speed value ω(k), on the basis of the estimated value $\omega_s$, as follows:

$$\omega_{HighLim}(k) = \omega_s + \Delta\omega_{limit} = \omega_k(k-1) + T\,K_t \cdot I(k-1)/J + \Delta\omega_{limit}$$

$$\omega_{LowLim}(k) = \omega_s - \Delta\omega_{limit} = \omega_k(k-n) + T\,K_t \cdot I(k-1)/J - \Delta\omega_{limit}$$

In this context, to achieve a noticeable reduction in the speed fluctuations, width $\pm\Delta\omega_{limit}$ of the tolerance band is preferably selected to be clearly smaller than the range of fluctuation of measured speed values ω(k).

One advantageous embodiment of the present invention provides for a load torque to be applied to the rotor, a load torque signal $M_L$ being provided for the load torque, and estimated speed value $\omega_s(k)$ being determined in each case from measured speed value $\omega_k(k-1)$ assigned to the earlier sampling instant, from current signal I, from load torque signal $M_L$, and from the moment of inertia value. Thus, the method is also suited for an electrical machine that has a load torque signal applied thereto. In this context, the load torque may decelerate or drive the rotor. The dynamic equation of the electrical machine is then expressed as:

$$J \cdot d\omega/dt = K_t \cdot I - M_L$$

From this, it is possible to determine estimated speed value $\omega_s(k)$, as well as upper boundary value $\omega_{HighLim}(k)$ and lower boundary value $\omega_{LowLim}(k)$ of the tolerance band as follows:

$$\omega_s(k) = \omega_k(k-1) + \frac{T \cdot K_t \cdot I(k-1)}{J} - \frac{T \cdot M_L(k-1)}{J}$$

$$\omega_{HighLim}(k) = \omega_s + \Delta\omega_{limit} = \omega_k(k-1) + T/J[K_t \cdot I(k-1) - M_L(k-1)] + \Delta\omega_{limit}$$

$$\omega_{HighLim}(k) = \omega_s + \Delta\omega_{limit} = \omega_k(k-1) + T/J[K_t \cdot I(k-1) - M_L(k-1)] - \Delta\omega_{limit}$$

One practical specific embodiment of the present invention provides for recording the electrical voltage that is applied across the winding, current values I(k) being indirectly determined from the voltage, from the impedance of the winding, from possibly corrected measured speed value $\omega(k)$ and from an output constant $K_e$. The relevant system equation is expressed as:

$$U = R_A \cdot I + L_A \cdot dI/dt + K_e \cdot \omega_k$$

In this context, $R_A$ is the ohmic resistance of the winding, $L_A$ the inductance of the winding, and $K_e$ the output constant of the electrical machine. The method is preferably used for electrical machines whose winding current is set by pulse-width modulation of an electrical voltage applied across the winding.

It is beneficial when the width and/or position of the tolerance band is selected as a function of measured speed value $\omega(k-1)$ assigned to the earlier sampling instant, and is preferably reduced in response to increasing speed and/or expanded in response to decreasing speed. In this manner, for example, in the case of an electrical machine having an applied speed-dependent load torque, for which only one estimated value or one average value exists whose accuracy is dependent on the speed, the speed dependency of the accuracy may be taken into consideration when determining the width of the tolerance band.

One advantageous embodiment of the present invention provides for the width and/or position of the tolerance band to be selected as a function of current signal I and preferably expanded in response to increasing current and/or reduced in response to decreasing current. In this context, the assumption is made that, in response to a high winding current, the rotor is typically accelerated, so that the speed increases correspondingly. Thus, the width and/or position of the tolerance band are/is adapted to the variations in the rotor speed that are to be expected based on the current supply to the winding.

When the speed signal is afflicted with noise, such as with a ripple component, the winding current usually fluctuates accordingly. In such a case, it may be advantageous to smooth current signal I by filtering, in particular by a sliding-type mean value generation, and to determine estimated value $\omega_s(k)$ for measured speed value $\omega(k)$ with the aid of filtered current signal I.

BRIEF DESCRIPTION OF THE DRAWING

An exemplary embodiment of the present invention is explained in greater detail in the following with reference to the drawing, in which.

DETAILED DESCRIPTION

Figure 1:
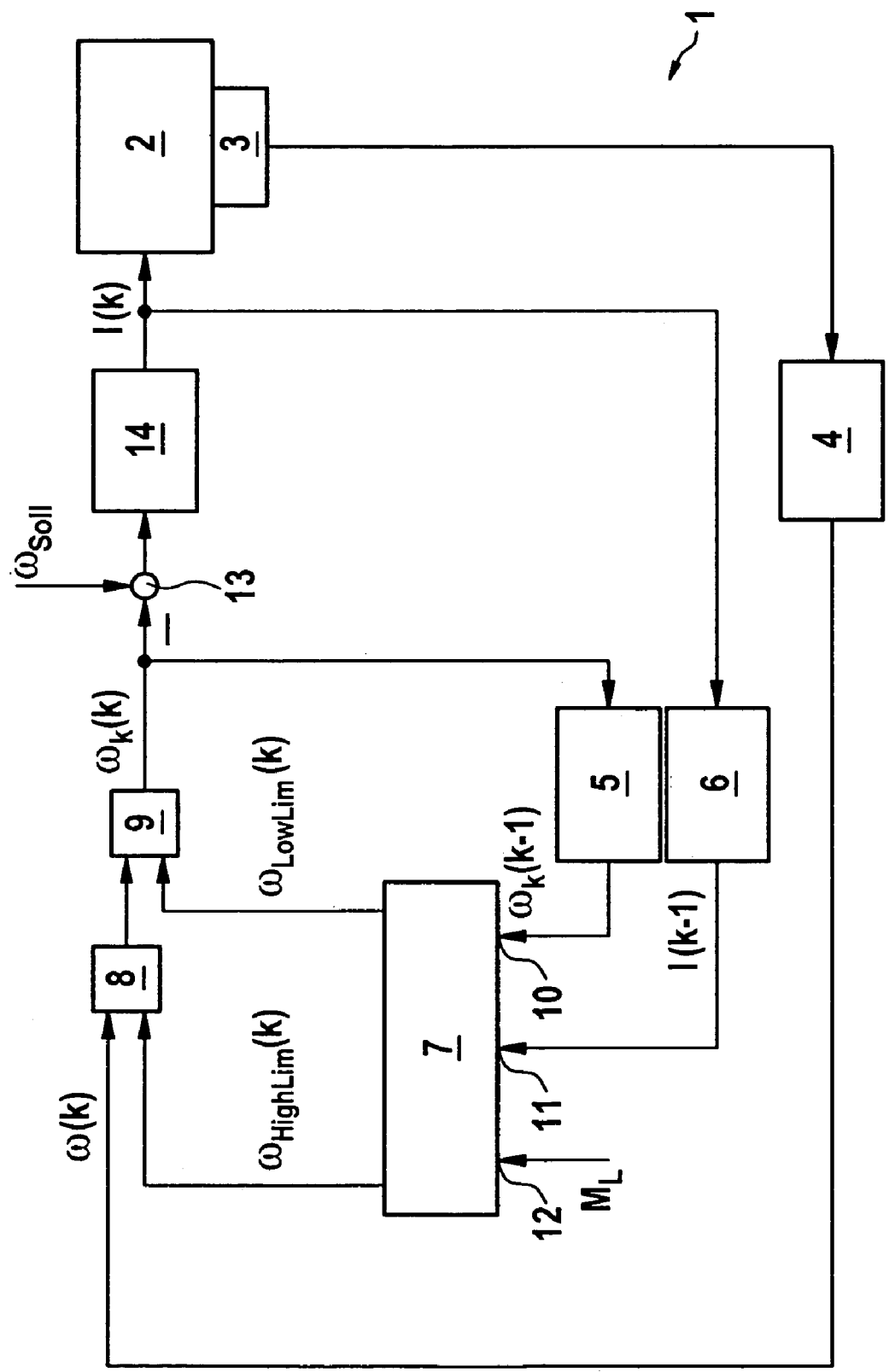
FIG. 1 shows a signal flow chart of a speed control circuit for an electric motor.

An electrical device has an electronically commutated motor and a speed control circuit, denoted as a whole by 1, for the electronically commutated motor. The electronically commutated motor is used as a drive motor for an adjusting device of a motor vehicle, for example for a camshaft-angle control device of a reciprocating piston combustion engine or for an adjusting device for a shift finger of a parallel manual transmission. The electronically commutated motor and the mechanical load driven by it form a controlled system which is denoted by 2 in the drawing.

Mounted on the electronically commutated motor is a speed sensor 3, which, for each phase of the electronically commutated motor winding, has a Hall-effect sensor, which cooperates in a generally known manner with a magnetized ring of the rotor of the electronically commutated motor in order to sample a speed-measurement signal for the rotor speed. The speed-measurement signal is fed to a sample and hold element 4, which, from the speed-measurement signal, by sampling at a constant sampling rate 1/T, generates a series of measured speed values $\omega(k)$, which are each assigned to a sampling instant k·T, k being an integral index and T a sampling time.

In addition, the electrical device has a limiting device for measured speed values $\omega(k)$, which includes two delay elements 5, 6, one computational device 7, and two comparators 8, 9. A speed-measurement signal input 10 of computational device 7 is linked via a first delay element 5 to a connection for a corrected speed signal $\omega_k(k)$. With the aid of first delay element 5, corrected speed signal $\omega_k(k)$ is delayed by a period of time corresponding to sampling time T. Thus, a speed signal $\omega_k(k-1)$ is present at speed-measurement signal input 10. A current signal input 11 of computational device 7 is linked via a second delay element 6 to a connection for a winding current signal I(k) of the electronically commutated motor. With the aid of second delay element 6, winding current signal I(k) is delayed by a period of time corresponding to sampling time T. Thus, a current signal I(k-1) is present at current signal input 11. In addition, computational device 7 has a load-torque signal input 12, which receives a signal that is a measure of average load torque $M_L$ of the electronically commutated motor.

With the aid of computational device 7, an upper boundary value $\omega_{HighLim}(k)$ and a lower boundary value $\omega_{LowLim}(k)$ for a tolerance band [$\omega_{LowLim}(k)$, $\omega_{HighLim}(k)$] assigned in the particular case to active sampling step k are calculated from speed signal $\omega_k(k-1)$, current signal I(k-1), delayed load torque signal $M_L$, sampling time T, a known moment of inertia value J of the rotor, a motor constant $K_t$ of the electronically commutated motor, and from a predefined interval size $\pm\Delta\omega_{limit}$:

$$\omega_{HighLim}(k) = \omega_k(k-1) + T/J[K_t \cdot I(k-1) - M_L(k-1)] + \Delta\omega_{limit}$$

$$\omega_{LowLim}(k) = \omega_k(k-1) + T/J[K_t \cdot I(k-1) - M_L(k-1)] \Delta\omega_{limit}$$

Upper boundary value $\omega_{HighLim}(k)$ is fed to a first input of a first comparator 8, which has a second input where speed signal $\omega(k)$ is present. An output of first comparator 8 is connected to a first input of a second comparator 9. The signal for lower boundary value $\omega_{LowLim}(k)$ ascertained with the aid of computational device 7 is present at a second input of second comparator 9. Speed signal $\omega_k(k)$, which has been corrected, i.e., limited to the tolerance band, is made available at an output of second comparator 9.

The output of second comparator 9 is connected to an actual value input of a third comparator 13. A speed setpoint signal $\omega_{setpoint}$, supplied, for example, by a higher level open-loop or closed-loop control, is present at a setpoint input of third comparator 13. The difference between speed setpoint signal $\omega_{setpoint}$ and corrected speed signal $\omega_k(k)$ is output as a system deviation at an output of third comparator 13. This output is linked to an input of a speed controller 14. Current signal I(k), previously referred to, is made available at an output of speed controller 13. In accordance with this current signal I(k), the winding of the electronically commutated motor is driven via a control device (not shown in greater detail in the drawing), for example by pulse-width modulation of an electrical voltage applied across the winding.

What is claimed is:

1. A method for controlling a system including measuring the speed of an electrical machine having a stator, a rotor and a winding, the method comprising:
   sampling a speed-measurement signal $\omega(k)$ by determining a measured speed value $\omega$ for the rotor for each of a series of sampling instants and controlling the system using at least the speed-measurement signal $\omega(k)$;
   determining a moment of inertia value for a mass moment of inertia of the rotor;
   sampling a current signal I by determining a current value I(k) for an electrical current in the winding for each of the sampling instants;
   determining an estimated value $\omega_s(k)$ for each of the measured speed values $\omega(k)$ using a measured speed value $\omega_k(k-1)$ assigned to an earlier sampling instant, using the current signal I, and using the moment of inertia value;
   assigning a tolerance band containing the estimated value $\omega_s(k)$ to the estimated value $\omega_s(k)$; and,
   replacing in the measured speed value $\omega(k)$ by a corrected speed value $\omega_k(k)$ that is within the tolerance band when the measured speed value $\omega(k)$ lies outside of the tolerance band.

2. The method as recited in claim 1, wherein the electrical machine includes an electronically commutated motor.

3. The method as recited in claim 1, further comprising applying a load torque to the rotor and providing a load torque signal $M_L$ for the load torque, and wherein determining of the estimated value $\omega_s(k)$ is performed using the measured speed value $\omega_k(k-1)$ assigned to the earlier sampling instant, using the current signal I, using the load torque signal $M_L$, and using the moment of inertia value.

4. The method as recited in claim 1, further comprising recording an electrical voltage applied across the winding, and wherein the determining of the current values I(k) is performed indirectly using the electrical voltage, using an impedance of the winding, using the corrected speed value $\omega_k(k)$ when present, and using an output constant.

5. The method as recited in claim 1, wherein the assigning of the tolerance band includes limiting the tolerance band by boundary values, and wherein the corrected speed value $\omega_k(k)$ is the boundary value that is the most proximate to the measured speed value $\omega(k)$ lying outside of the tolerance band.

6. The method as recited in claim 1, wherein the assigning of the tolerance band includes selecting of at least one of a width and a position of the tolerance band as a function of the measured speed value $\omega_k(k-1)$ assigned to the earlier sampling instant.

7. The method as recited in claim 6, wherein the assigning of the tolerance band includes at least one of reducing the tolerance band in response to increasing speed and expanding the tolerance band in response to decreasing speed.

8. The method as recited in claim 1, wherein the assigning of the tolerance band includes selecting of at least one of a width and a position of the tolerance band as a function of current signal I.

9. The method as recited in claim 8, wherein the assigning of the tolerance band includes at least one of expanding the tolerance band in response to increasing current and reducing the tolerance band in response to decreasing current.

10. The method as recited in claim 1, wherein further comprising smoothing the current signal by filtering, and wherein the determining of the estimated value $\omega_s(k)$ using the filtered current signal I.

11. The method as recited in claim 10, wherein the filtering includes a sliding-type mean value generation.

* * * * *

UNITED STATES PATENT AND TRADEMARK OFFICE
CERTIFICATE OF CORRECTION

PATENT NO. : 7,248,990 B2 Page 1 of 1
APPLICATION NO. : 11/173577
DATED : July 24, 2007
INVENTOR(S) : Holger Stork, Martin Zimmermann and Michael Schuhen It is certified that error appears in the above-identified patent and that said Letters Patent is hereby corrected as shown below:

In column 4, line 66 should read: -- $-\Delta\omega_{limit}$ --

Signed and Sealed this

Fourth Day of December, 2007

JON W. DUDAS
*Director of the United States Patent and Trademark Office*